United States Patent
Chuang et al.

(10) Patent No.: US 7,639,479 B2
(45) Date of Patent: Dec. 29, 2009

(54) PORTABLE ELECTRONIC DEVICE HAVING A COVER ROTATABLE WITH RESPECT TO A BASE

(75) Inventors: I-Chen Chuang, Taoyuan (TW); San-Chi Ho, Taoyuan (TW); Ko-Min Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 139 days.

(21) Appl. No.: 11/637,158

(22) Filed: Dec. 12, 2006

(65) Prior Publication Data

US 2007/0217129 A1 Sep. 20, 2007

(30) Foreign Application Priority Data

Mar. 17, 2006 (TW) ............................ 95109291 A

(51) Int. Cl.
*G06F 1/16* (2006.01)

(52) U.S. Cl. ............................ 361/679.06; 361/679.11; 361/679.12; 361/679.27

(58) Field of Classification Search ................ 361/679, 361/681, 680, 679.02, 679.04, 679.06, 679.11, 361/679.12, 649.2, 679.21, 679.27
See application file for complete search history.

(56) References Cited

U.S. PATENT DOCUMENTS

| 5,105,335 | A | * | 4/1992 | Honda | 361/679 |
| 5,337,212 | A | * | 8/1994 | Bartlett et al. | 361/681 |
| 5,900,848 | A | * | 5/1999 | Haneda et al. | 345/1.1 |
| 6,351,372 | B1 | * | 2/2002 | Kim | 361/683 |
| 6,480,374 | B1 | * | 11/2002 | Lee | 361/681 |
| 2003/0103324 | A1 | * | 6/2003 | Gallivan | 361/681 |

* cited by examiner

*Primary Examiner*—Michael C Zarroli
(74) *Attorney, Agent, or Firm*—Birch, Stewart, Kolasch & Birch, LLP

(57) ABSTRACT

A portable electronic device includes a base, a cover and a connecting element. The cover includes a track and a rotating portion next to the track. The connecting element is connected to the base wherein the track is movable with respect to the connecting element and is connected to the connecting element. When the connecting element is in the rotating portion, the cover is rotatable with respect to the base.

20 Claims, 8 Drawing Sheets

PORTABLE ELECTRONIC DEVICE HAVING A COVER ROTATABLE WITH RESPECT TO A BASE

BACKGROUND OF THE INVENTION

1. Field of the Invention

The invention relates to a portable electronic device, and in particular to a portable electronic device having a cover.

2. Description of the Related Art

Referring to FIG. 1, a conventional portable electronic device 10 comprises a base 11 and a cover 12. The cover 12 is pivoted to the base 11 via the connecting element 13. Users prefer portable electronic devices to be small. A small electronic device is convenient to carry and hand-held portable electronic devices are the most convenient. Referring to FIG. 1, when using portable electronic device 10, the cover 12 is opened (the cover 12 opens along an arrow A) to increase the usable volume of the portable electronic device 10. Thus, when the cover 12 is open, the portable electronic device 10 is no longer convenient for use in a user's palm.

BRIEF SUMMARY OF INVENTION

A detailed description is given in the following embodiments with reference to the accompanying drawings.

The invention provides a portable electronic device. The portable electronic device comprises a base, a cover, and a connecting element. The cover comprises a track and a rotating portion next to the track. The connecting element is pivoted to the base and movably connected to the track. When the connecting element moves in the rotating portion, the connecting element rotates in the rotating portion.

The invention provides a portable electronic device. The portable electronic device comprises a base, a cover, and a connecting element. The base comprises a track and a rotating portion next to the track. The connecting element is pivoted to the cover and movably connected to the track. When the connecting element moves in the rotating portion, the connecting element rotates in the rotating portion.

The invention provides a portable electronic device. The portable electronic device comprises a base, a display panel, and a connecting element. The display panel comprises a track and a rotating portion next to the track. The connecting element is pivoted to the base and movably connected to the track. When the connecting element moves in the rotating portion, the connecting element rotates in the rotating portion.

The invention provides a portable electronic device. The portable electronic device comprises a base, a display panel, and a connecting element. The base comprises a track and a rotating portion next to the track. The connecting element is pivoted to the display panel and movably connected to the track. When the connecting element moves in the rotating portion, the connecting element rotates in the rotating portion.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
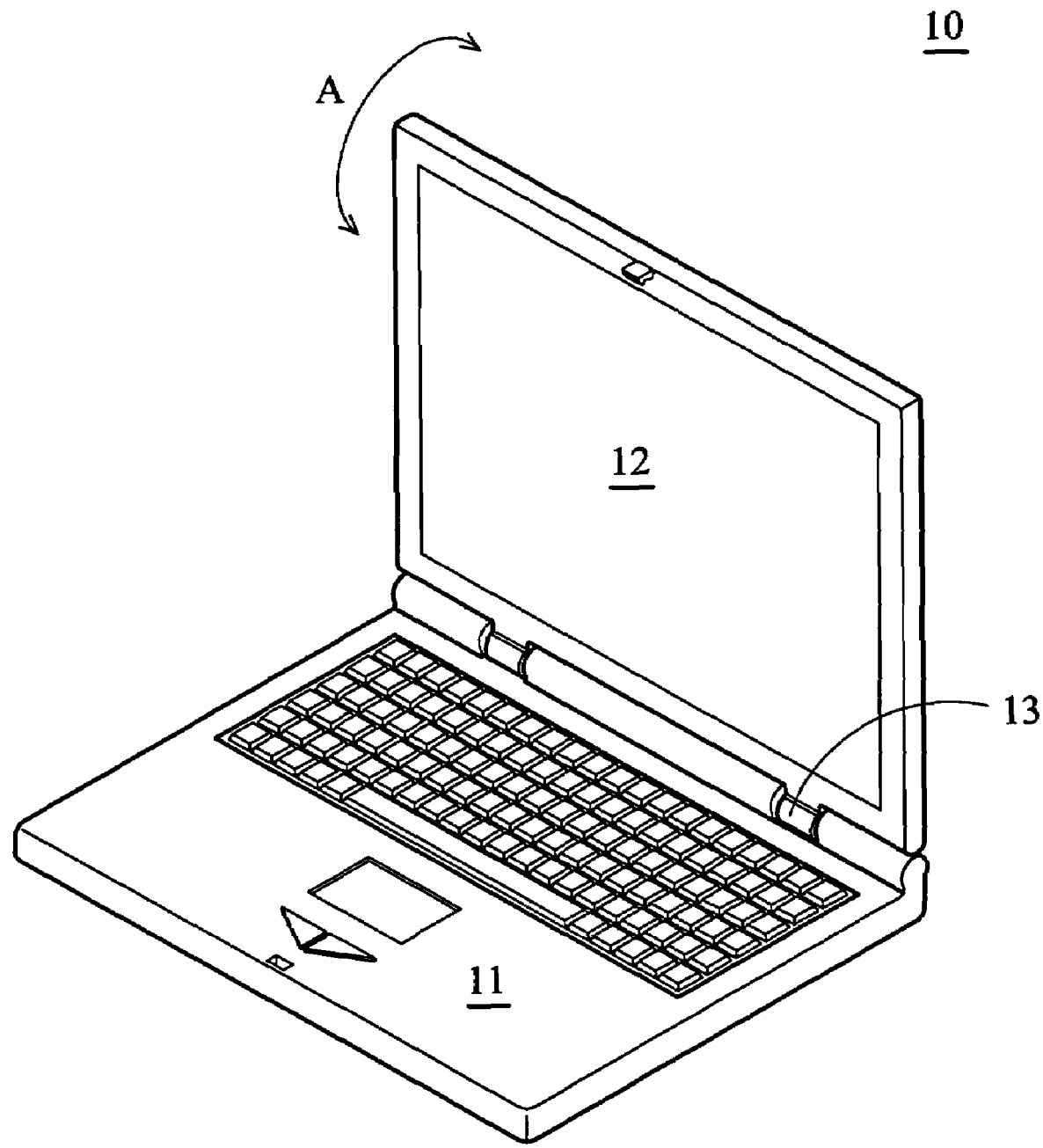
FIG. 1 is a schematic view of a conventional portable electronic device.
Figure 2A:
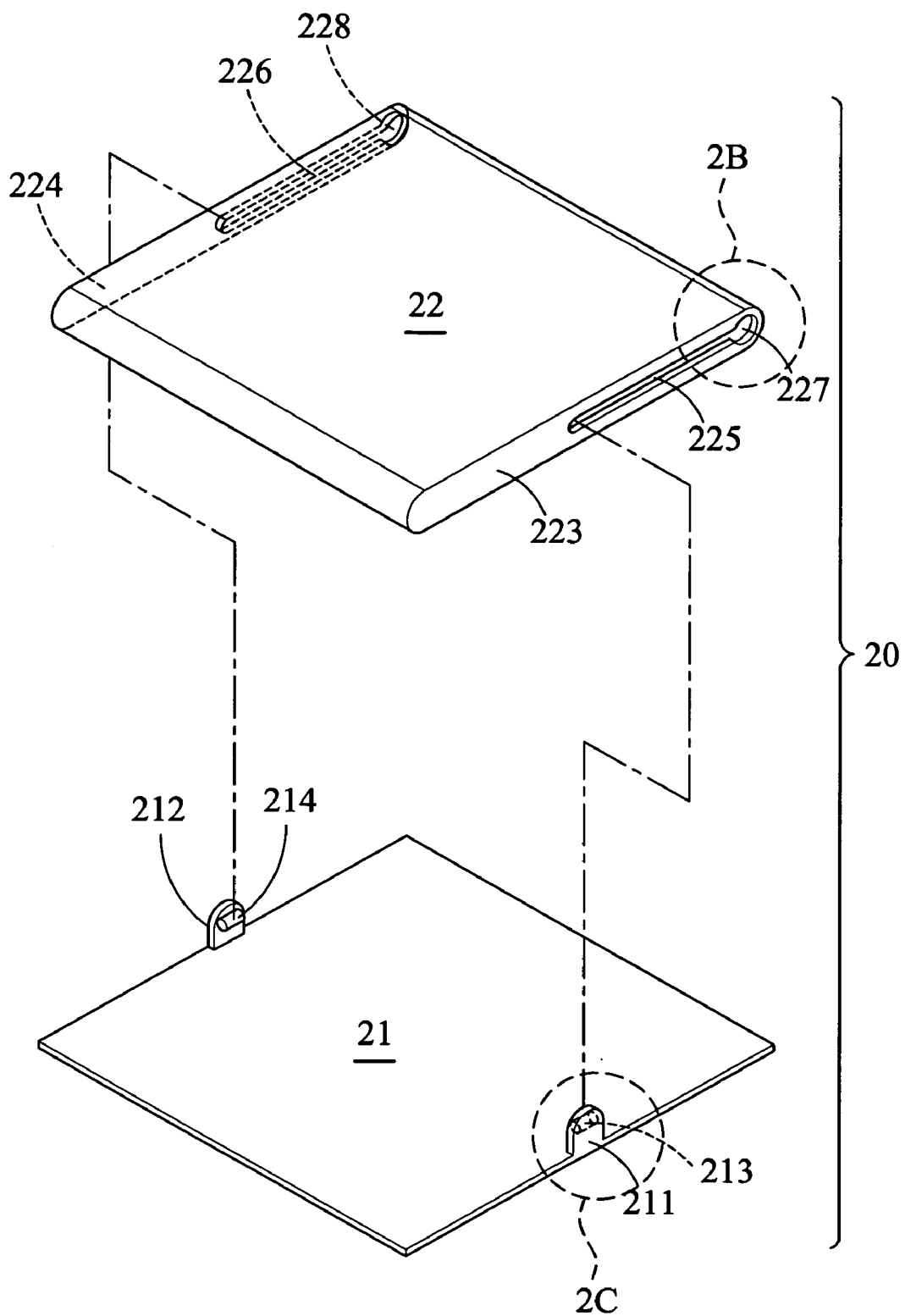
FIG. 2A is an exploded drawing of a portable electronic device of the invention.
Figure 2B:
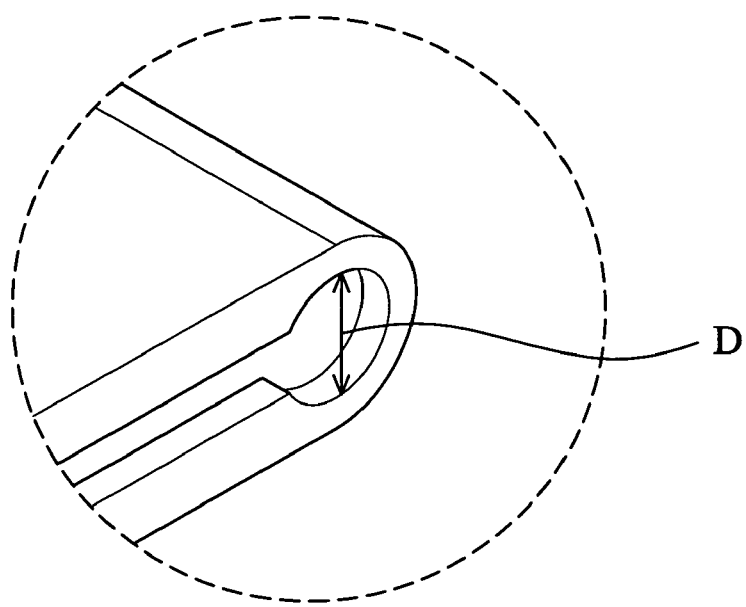
FIGS. 2B to 2C are enlarged drawings of FIG. 2A.
Figure 2C:
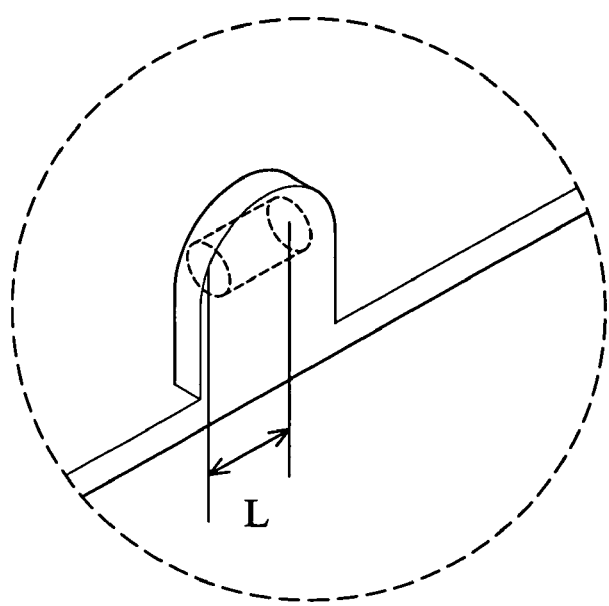

Referring to FIGS. 2A to 2C, the portable electronic device 20 comprises a base 21 and a cover 22. The cover 22 comprises a second surface 229, tracks 225 and 226, and rotating portions 227 and 228 on two sides thereof. The base 21 comprises connecting elements 211 and 212 corresponding to the sides of the cover 22. One end of the connecting elements 211 and 212 respectively comprise connecting portions 213 and 214 protrudingly installed thereon to connect to the tracks 225 and 226. The other ends pivot to the base 21. In this embodiment, the connecting portions 213 and 214 are protruding rectangular blocks. Referring to FIG. 3E, the cover 22 comprises a first surface 221. The first surface 221 comprises a display panel 222.

Figure 3A:
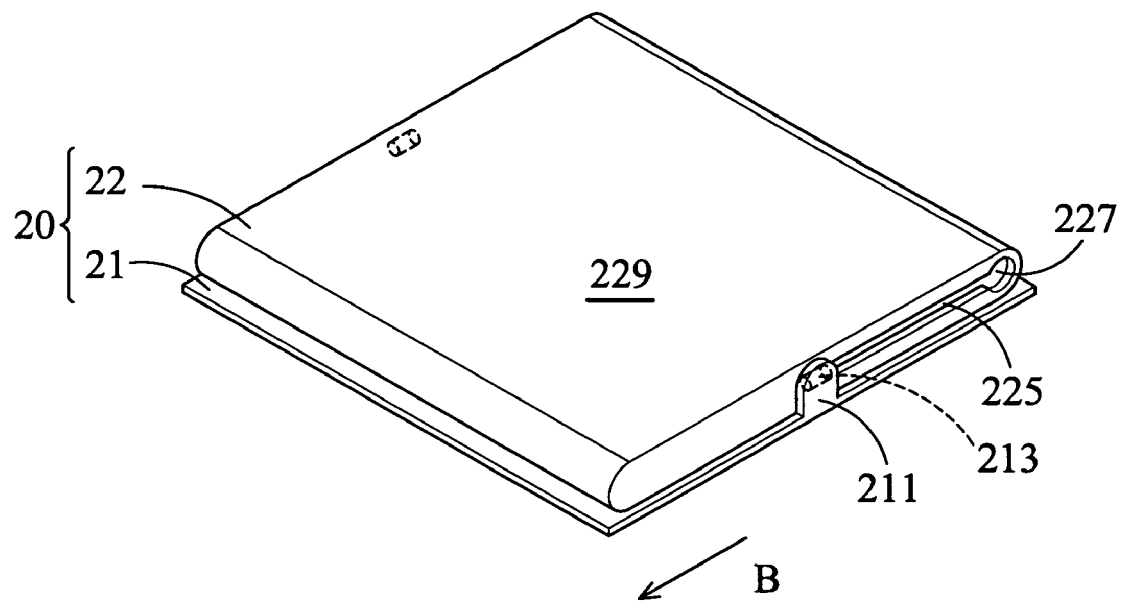
FIGS. 3A to 3H show that a process opening a portable electronic device of the invention.

FIG. 3A shows the portable electronic device 20 in a closed state (the first surface 221 of the display panel 222 faces downward and the second surface 229 faces upward).

Figure 3B:
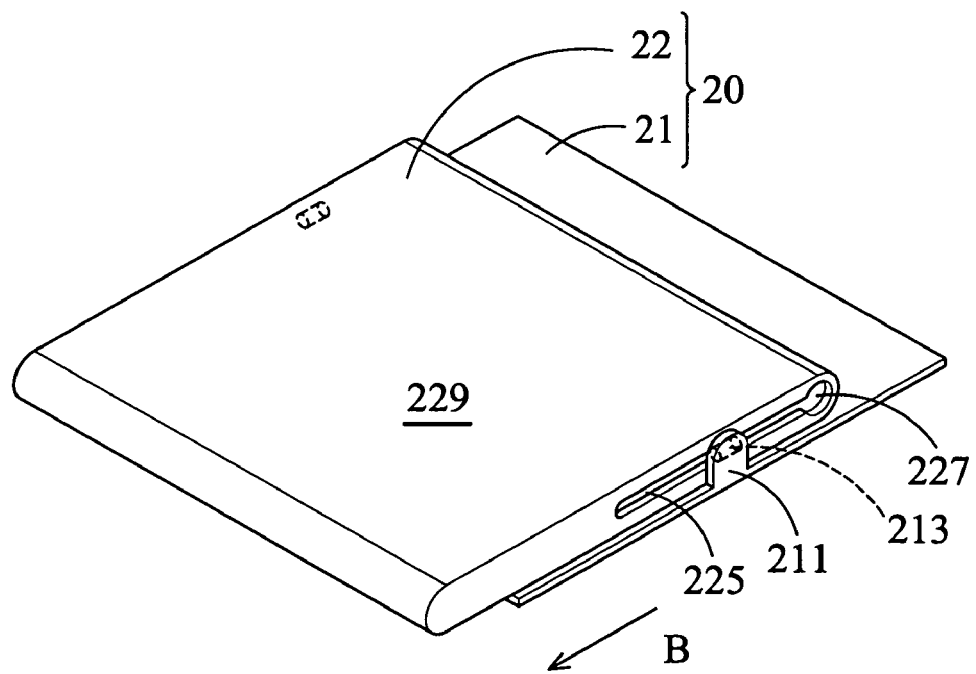

Referring to FIGS. 2A, 3A and 3B, when a user uses the portable electronic device 20, the cover 22 is forced along an arrow B. The tracks 225 and 226 are movable with respect to the connecting portions 213 and 214. Because the tracks 225 and 226 limit the rectangular connecting portions 213 and 214, the connecting portions 213 and 214 can not rotate therein. It should be noted that the rotating portion 227 and 228 are circular. The length of the connecting portions 213 and 214 is larger than a width of the corresponding one of the tracks 225 and 226.

Figure 3C:
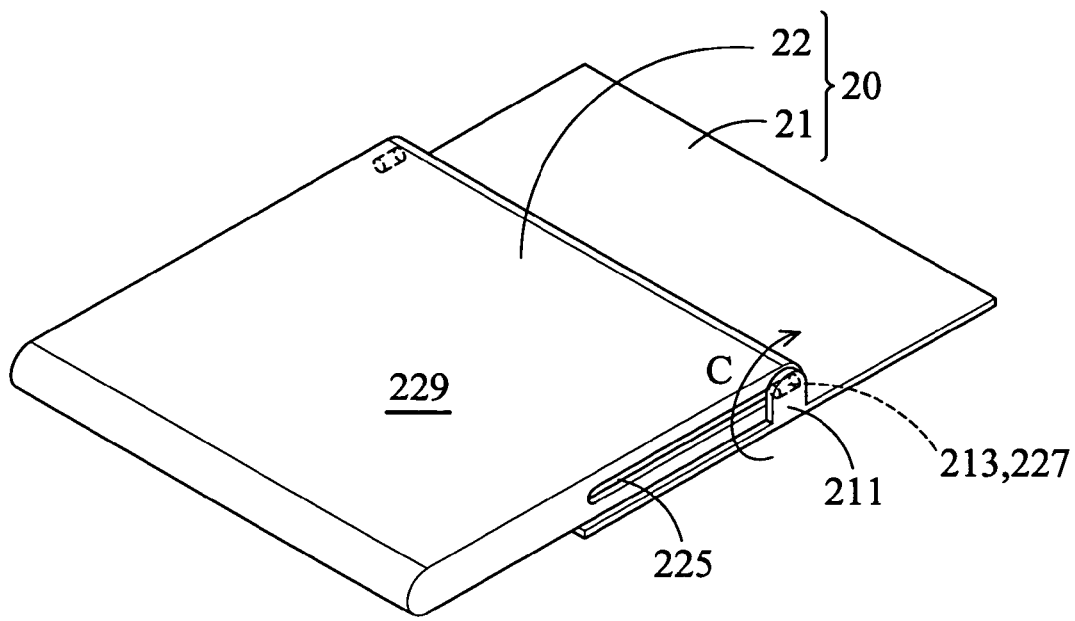
Figure 3D:
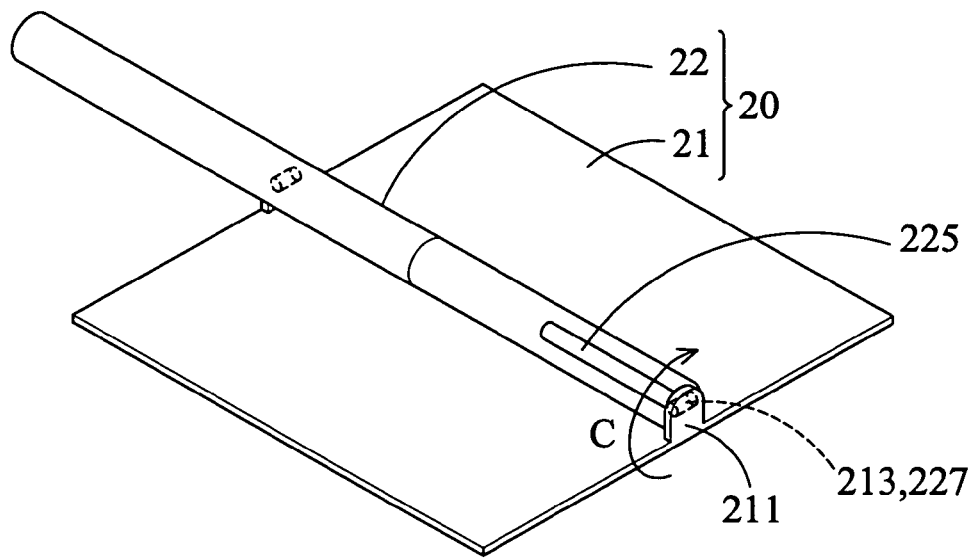
Figure 3E:
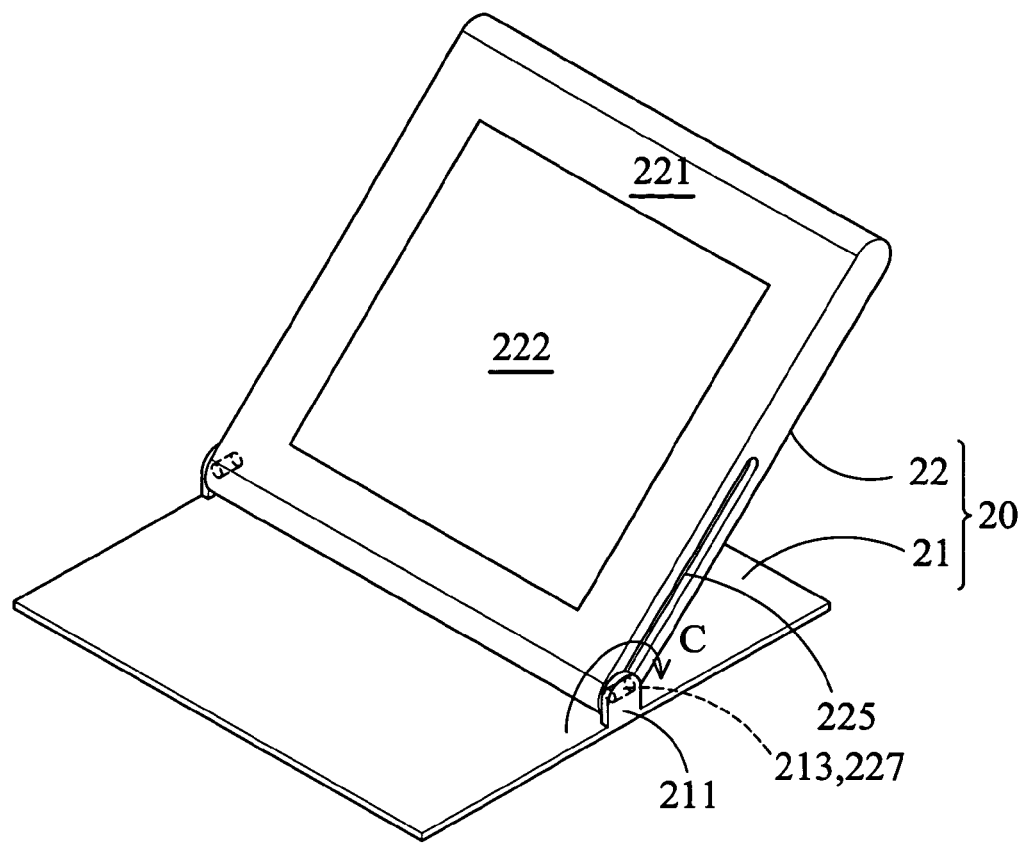
Figure 3F:
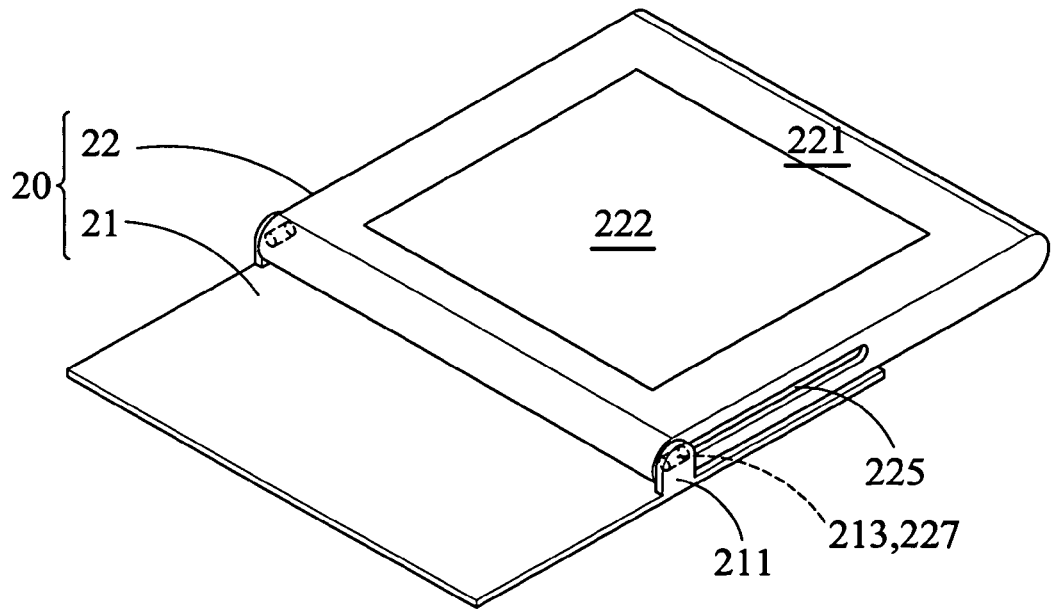
Figure 3G:
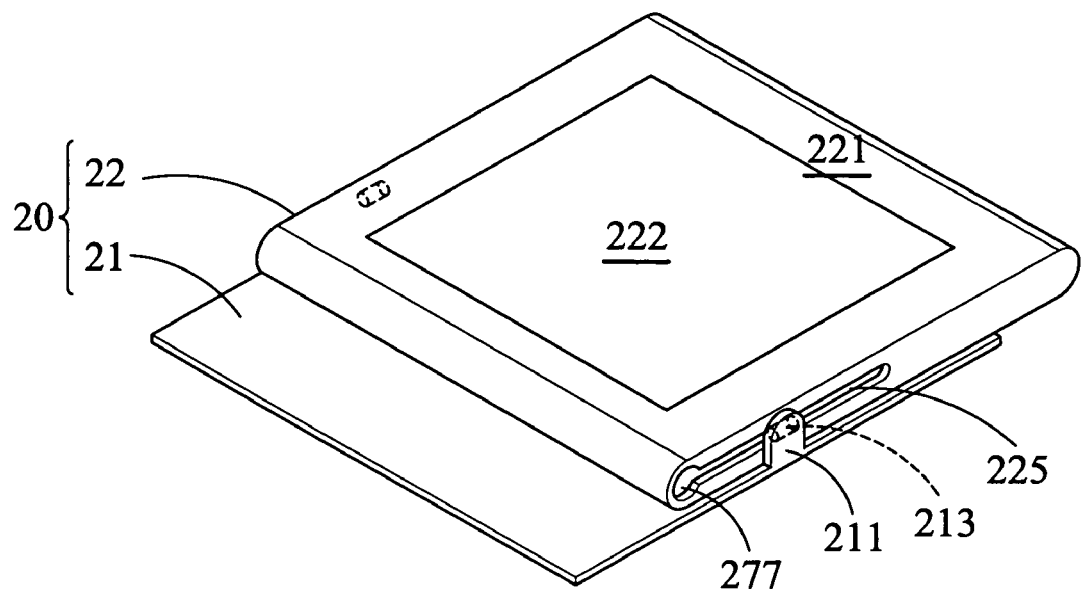
Figure 3H:
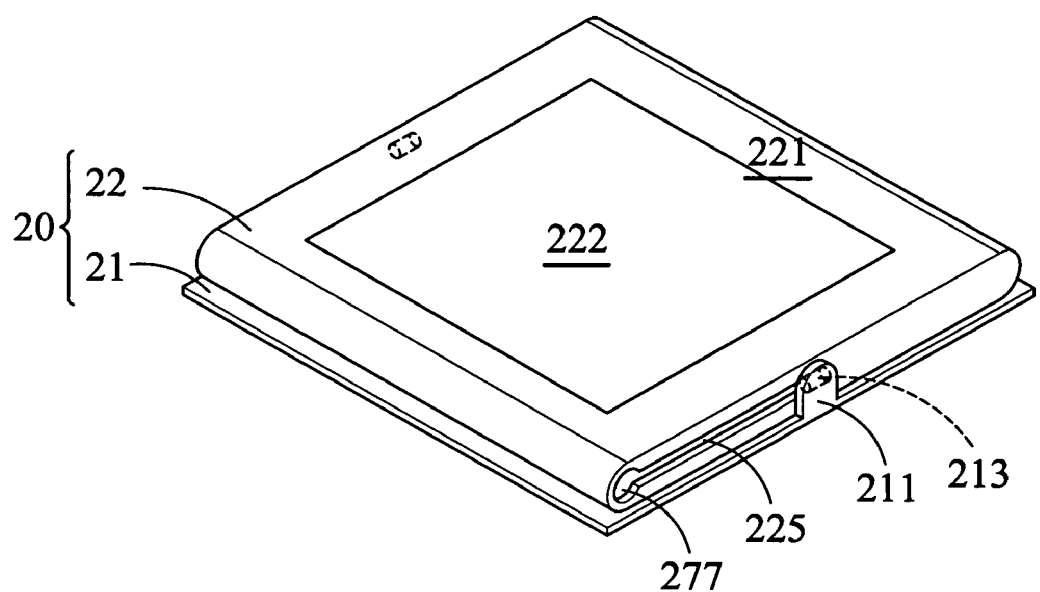

Referring to FIGS. 3C to 3E, when the connecting portions 213 and 214 are in the rotating portions 227 and 228, the cover 22 can rotate along an arrow C. Because the length L of the connecting portions 213 and 214 are less than the diameter D (shown by FIG. 2B) of the rotating portions 227 and 228, the connecting portions 213 and 214 allow the rotating portions 227 and 228 to rotate. Thus, the cover 22 is rotatable between 0 degree and 180 degrees with respect to the base 21. After the cover rotates about 180 degrees, the first surface 221 of the display panel 222 faces upward and the second surface 229 faces downward (shown by FIG. 3F). FIGS. 3G and 3H show that the cover 22 is forced along an arrow E until the cover 22 covers the base 21. FIG. 3H shows the portable electronic device 20 in an open state. Note that the cover 22 may be a display panel.

The volume of the portable electronic device 20 does not increase, regardless of whether the portable electronic device 20 is opened or closed. Keeping the volume of the portable electronic device 20 small allows a user to use the portable electronic device 20 in their palm.

Figure 4:
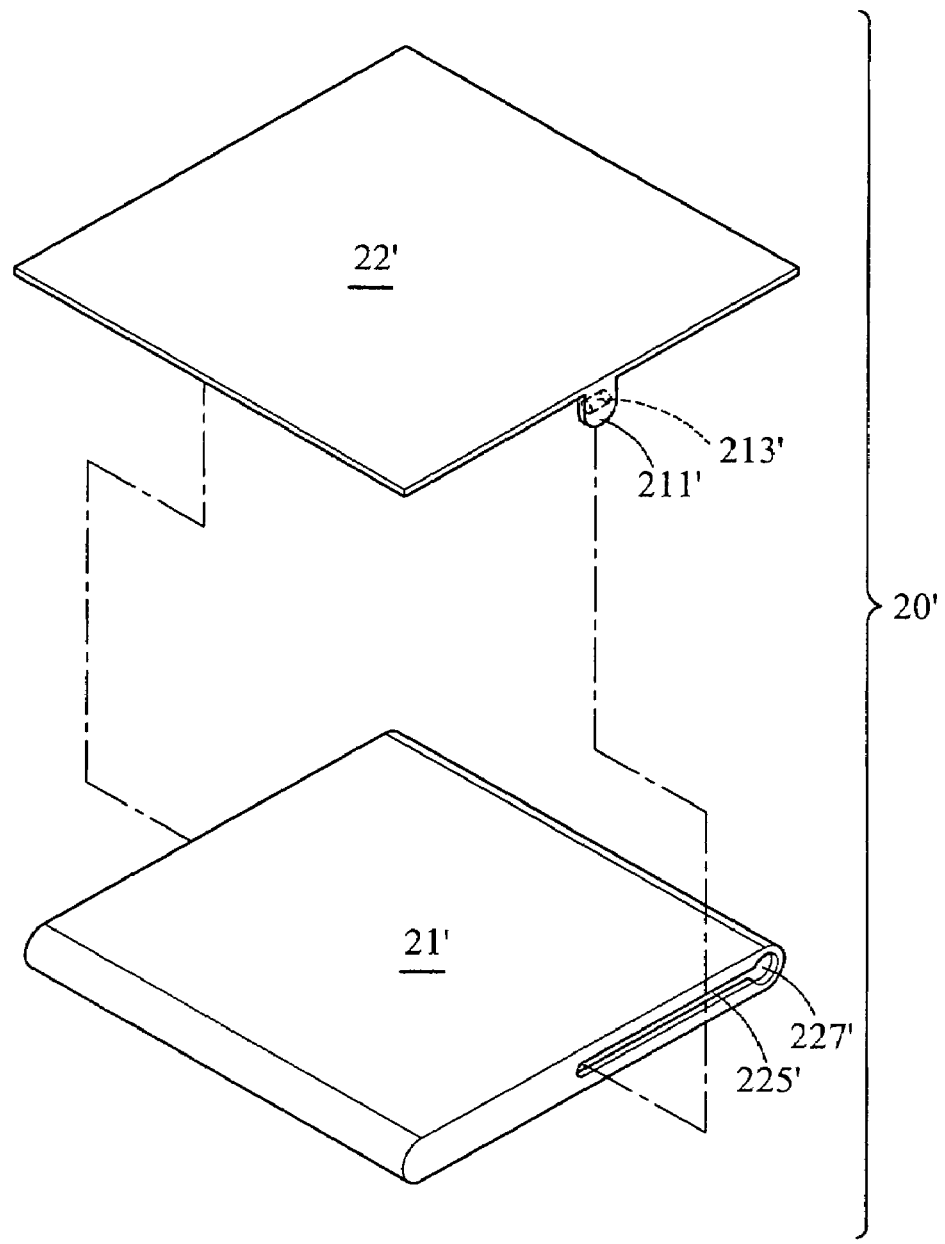
FIG. 4 is an exploded drawing of another portable electronic device of the invention.

In another embodiment of a portable electronic device 20', as shown in FIG. 4, the track 225' and the rotating portion 227' are installed on the base 21' but not on the cover 22'. A connecting element 211' is connected to the cover 22' and movably connected to the track 225' through a connecting portion 213'. The structure of this embodiment is approximately similar, thus, further description is omitted.

Note that the cover 22 of the invention may be a display panel. The tracks and the rotating portions may be installed on the display or the base. The structure of this embodiment is approximately similar, thus, further description is omitted.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
    a base;
    a cover, comprising a plurality of tracks and a rotating portion being circular and connected to a corresponding one of the tracks; and
    a connecting element connected to the base and comprising a connecting portion, wherein the corresponding one of the tracks is movable with respect to the connecting element and is connected to the connecting element, and the connecting portion is a protruding rectangular block;
    wherein when the connecting element is in the rotating portion, the cover is rotatable with respect to the base,
    wherein a length of the connecting portion is less than a diameter of the rotating portion, and
    wherein the length of the connecting portion is larger than a width of the corresponding one of the tracks.

2. The portable electronic device as claimed in claim 1, wherein each of the tracks comprises a groove.

3. The portable electronic device as claimed in claim 1, wherein the connecting portion is moveably connected to the corresponding one of the tracks.

4. The portable electronic device as claimed in claim 3, wherein the connecting portion protrudes on the connecting element.

5. The portable electronic device as claimed in claim 1, wherein the rotating portion is rotatable between 0 degree and 180 degrees with respect to the connecting element.

6. The portable electronic device as claimed in claim 1, wherein the cover comprises a display panel.

7. The portable electronic device as claimed in claim 1, wherein the connecting element has a connection portion movable within the corresponding one of the tracks and rotatable within the rotating portion.

8. A portable electronic device, comprising:
    a base, comprising a plurality of tracks and a rotating portion connected to a corresponding one of the tracks, wherein the rotating portion is circular;
    a cover; and
    a connecting element connected to the cover and comprising a connecting portion, wherein the connecting element is movable with respect to the corresponding one of the tracks and is connected to the corresponding one of the tracks, and the connecting portion is a protruding rectangular block;
    wherein when the connecting element is in the rotating portion, the cover is rotatable with respect to the base,
    wherein a length of the connecting portion is less than a diameter of the rotating portion, and
    wherein the length of the connecting portion is larger than a width of the corresponding one of the tracks.

9. The portable electronic device as claimed in claim 8, wherein each of the tracks comprises a groove.

10. The portable electronic device as claimed in claim 8, wherein the connecting portion is movably connected to the corresponding one of the tracks.

11. The portable electronic device as claimed in claim 10, wherein the connecting portion protrudes on the connecting element.

12. The portable electronic device as claimed in claim 8, wherein the connecting element is rotatable between 0 degree and 180 degrees in the rotating portion.

13. The portable electronic device as claimed in claim 8, wherein the cover comprises a display panel.

14. The portable electronic, device as claimed in claim 8, wherein the connecting element has a connection portion movable within the corresponding one of the tracks and rotatable within the rotating portion.

15. A portable electronic device, comprising:
    a base;
    a display panel, comprising a plurality of tracks and a rotating portion being circular and connected to a corresponding one of the tracks; and
    a connecting element connected to the base and comprising a connecting portion, wherein the corresponding one of the tracks is movable with respect to the connecting element and is connected to the connecting element, and the connecting portion is a protruding rectangular block;
    wherein when the connecting element is in the rotating portion, the display panel is rotatable with respect to the base,
    wherein a length of the connecting portion is less than a diameter of the rotating portion, and
    wherein the length of the connecting portion is larger than a width of the corresponding one of the tracks.

16. The portable electronic device as claimed in claim 15, wherein each of the tracks is a groove.

17. The portable electronic device as claimed in claim 15, wherein the connecting portion is movably connected to the corresponding one of the tracks.

18. The portable electronic device as claimed in claim 17, wherein the connecting portion protrudes on the connecting element.

19. The portable electronic device as claimed in claim 15, wherein the rotating portion is rotatable between 0 degree and 180 degrees with respect to the connecting element.

20. The portable electronic device as claimed in claim 15, wherein the connecting element has a connection portion movable within the corresponding one of the tracks and rotatable within the rotating portion.

* * * * *

UNITED STATES PATENT AND TRADEMARK OFFICE
CERTIFICATE OF CORRECTION

PATENT NO. : 7,639,479 B2
APPLICATION NO. : 11/637158
DATED : December 29, 2009
INVENTOR(S) : Chuang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 156 days.

Signed and Sealed this

Twenty-first Day of December, 2010

David J. Kappos
*Director of the United States Patent and Trademark Office*